United States Patent [19]

Degelman

[11] Patent Number: 5,622,229
[45] Date of Patent: Apr. 22, 1997

[54] HARROW BAR ASSEMBLY

[75] Inventor: Wilfred J. Degelman, Raymore, Canada

[73] Assignee: Degelman Industries, Inc., Saskatchewan, Canada

[21] Appl. No.: 589,430

[22] Filed: Jan. 22, 1996

Related U.S. Application Data

[63] Continuation of Ser. No. 164,952, Dec. 10, 1993, abandoned.

[51] Int. Cl.⁶ .......................... A01B 19/02; A01B 73/02
[52] U.S. Cl. .................. 172/621; 172/634; 172/639; 172/311
[58] Field of Search .................. 172/462, 497, 172/614, 615, 619, 620, 621, 622, 624, 634, 635, 659, 660, 643, 684, 687, 705–708, 711, 773, 763, 311, 264, 441, 499, 776, 240; 56/371, DIG. 74; 403/388, 395, 398, 399, 231

[56] References Cited

U.S. PATENT DOCUMENTS

| | | | |
|---|---|---|---|
| 1,314,680 | 9/1919 | Long | 172/498 |
| 2,321,663 | 6/1943 | Donovan | 172/621 |
| 2,736,252 | 2/1956 | Latshaw | 97/8 |

(List continued on next page.)

FOREIGN PATENT DOCUMENTS

| | | | |
|---|---|---|---|
| 1047823 | 2/1979 | Canada | 97/71.1 |
| 1119452 | 3/1982 | Canada | 97/83 |
| 1212569 | 10/1986 | Canada | 97/124 |
| 77398 | 4/1954 | Denmark | 172/711 |
| 86356 | 8/1983 | European Pat. Off. | 172/711 |
| 80576 | 4/1934 | Switzerland | 172/711 |
| 745484 | 2/1956 | United Kingdom | 7/1 |

OTHER PUBLICATIONS

Brochure from flexi–coil—Harrow Drawbar—System 82 published Nov. 17, 1986.
Brochure from REM Manufcturing Ltd.-The Delta Flexible Harrow published date unknown.
Brochure from Brandt Industries Ltd.—Brandt Rotary Harrow—The "Soil Saver"—published date unknown.
Brochure from High–Line Mfg. Inc.—New Active Harrow Copyright 1992.
Brochure from Morris—Rangler II Packer Harrow Bar published 02, 1992.
Brochure from Bourgault—5400 Vers–A–Bar published date unknown.
Brochure from Bourgault—Vers–A–Bar Model 5400 published date unknown.
Brochure from Bergen Industries Inc.—Bergen "Caleb" Harrow Bar system—published date unknown.
Brochure from M. Gates Manufacturing—Magnum Harrow Sections published date unknown.
Prairie Agricultural Machinery Institute Evaluation Report 572 of Flexi–Coil System 0.95 Harrow Packer Drawbar published Mar. 1988.

*Primary Examiner*—Henry E. Raduazo
*Assistant Examiner*—Robert Pezzuto
*Attorney, Agent, or Firm*—Davis and Bujold

[57] ABSTRACT

A harrow drawbar assembly is described which includes a harrow frame with depending tines and at least one spring strap. The at least one spring strap has a first end and a second end. The second end of the at least one spring strap is secured to the harrow frame. Means is provided for attaching the first end of the at least one spring strap to a drawbar. The at least one spring strap extends substantially horizontally from the drawbar and serves as means by which the harrow frame is pulled by the drawbar. The at least one spring strap exerts a downward pressure upon the harrow frame to maintain the tines of the harrow frame in contact with a ground surface. This harrow drawbar assembly is intended to restrict vertical movement and generally improve the ability of the harrow to follow ground surface contours.

1 Claim, 3 Drawing Sheets

U.S. PATENT DOCUMENTS

| | | | |
|---|---|---|---|
| 2,884,081 | 4/1959 | Weber | 172/643 |
| 3,314,485 | 4/1967 | Godbersen | 172/178 |
| 3,500,936 | 3/1970 | Vigen | 172/198 |
| 3,503,452 | 3/1970 | Godbersen | 172/711 |
| 3,774,694 | 11/1973 | Gates | 172/617 |
| 3,866,688 | 2/1975 | Hansen | 172/311 |
| 3,991,831 | 11/1976 | Foster | 172/198 |
| 4,058,172 | 11/1977 | Blair et al. | 172/311 |
| 4,147,217 | 4/1979 | Hawkins, Jr. | 172/662 |
| 4,171,725 | 10/1979 | Saugstad et al. | 172/59 |
| 4,183,231 | 1/1980 | van der Lely | 64/28 R |
| 4,183,412 | 1/1980 | van der Lely | 172/59 |
| 4,318,524 | 3/1982 | Degelman | 248/214 |
| 4,320,805 | 3/1982 | Winter | 172/776 |
| 4,354,557 | 10/1982 | van der Lely et al. | 172/49.5 |
| 4,355,690 | 10/1982 | Jensen et al. | 172/311 |
| 4,402,367 | 9/1983 | Couser | 172/456 |
| 4,465,143 | 8/1984 | van der Lely | 172/36 |
| 4,736,802 | 4/1988 | Domin | 172/36 |
| 4,811,795 | 4/1989 | Dean et al. | 172/456 |
| 4,877,090 | 10/1989 | Gullickson | 172/311 |
| 5,042,589 | 8/1991 | Hundeby et al. | 172/462 |
| 5,088,563 | 2/1992 | Shidler | 172/456 |
| 5,358,056 | 10/1994 | Gates | 172/621 |

HARROW BAR ASSEMBLY

CROSS-REFERENCE TO RELATED APPLICATIONS

This is a continuation of application Ser. No. 08/164,952 filed on Dec. 10, 1993, now abandoned.

BACKGROUND OF THE INVENTION

A common means used for mounting a harrow to a drawbar involves suspending the harrow by chains from secondary support arms which extend horizontally from a drawbar. Harrows that are suspended from chains have difficulty in following ground surface contours. They are subject to vertical lifting which leaves wads of straw behind. They nose dive into the ground surface when slopes or impediments are encountered. They become airborne at high tractor speeds; tending to skip along the ground.

SUMMARY OF THE INVENTION

What is required is a harrow drawbar assembly which improves the ability of the harrow to follow ground surface contours.

According to the present invention there is provided a harrow drawbar assembly which includes a harrow frame with depending tines and at least one spring strap. The at least one spring strap has a first end and a second end. The second end of the at least one spring strap is secured to the harrow frame. Means is provided for attaching the first end of the at least one spring strap to a drawbar. The at least one spring strap extends substantially horizontally from the drawbar and serves as means by which the harrow frame is pulled by the drawbar. The at least one spring strap exerts a downward pressure upon the harrow frame to maintain the tines of the harrow frame in contact with a ground surface.

With the harrow drawbar assembly, as described, the harrow follows land contours better than traditional harrows. It is preferred that there be two spring straps positioned along opposed sides of the harrow frame. This provides an even distribution of pressure from the spring straps to the harrow frame. The spring straps exert a downward pressure and flex in response to counterpressure from the land contours. The spring straps restrict vertical movement of the harrow to reduce problems of ground skipping, nose diving and the leaving of straw wads. When the drawbar is in the form of a rotatable mounting beam even more beneficial results may be obtained. The spring straps serve as cantilevers and increased pressure may be exerted to force the harrow into firmer engagement with the ground surface via the spring straps by rotating the mounting beam. It is preferred that a clearance space be provided between the drawbar and the harrow frame thereby permitting the harrow frame to freely conform to contours of the ground surface without interference from the drawbar. It is also preferred that the spring straps be stiff enough so that the harrow can be pulled by the springs alone. It is finally preferred that the springs be capable of carrying the weight of the harrow when the mounting beam is rotated 90 degrees into a transport position.

Although beneficial results may be obtained through the use of the harrow drawbar assembly, as described above, it is desirable to have the harrow even more sensitive to the contours by pivoting about a vertical axis as depressions, ridges, rocks and debris on the ground surface are encountered. Even more beneficial results may, therefore, be obtained when the harrow frame has a raised spring mounting support bracket to which the second end of the at least one spring strap is attached. This raises the at least one spring strap above the harrow frame and maintains the at least one spring strap in spaced relation to the harrow frame to accommodate limited pivotal movement of the harrow frame. A related feature that is preferred is the provision of a support cradle extends from the harrow frame adjacent the first end of the at least one spring strap. The support cradle overlies and limits movement of the at least one spring strap and has a clearance space to accommodate limited pivotal movement of the harrow frame.

Although beneficial results may be obtained through the use of the harrow drawbar assembly, as described above, more control is obtained over the angle of the tines relative to the ground surface and the pressure exerted by the tines when the tines are spring-form tines mounted onto cross-members which are pivotally attached to the harrow by a pivot linkage. The pivot linkages for each of the cross-members are connected to an adjustment arm forming a parallelogram linkage. Means is provided for shifting the position of the parallelogram linkage thereby pivoting the pivot linkages to alter the position of the cross-members and the force with which the spring-form tines engage the ground surface. The preferred means for shifting the parallelogram linkage is a mechanical screw linkage which includes a screw and at least one travelling member rotatably attached to the screw. The mechanical screw linkage has a first end fixed to the harrow frame and a second end secured to the parallelogram linkage.

Although beneficial results may be obtained through the use of the harrow drawbar assembly, as described above, tine replacement on existing equipment can be time consuming. Even more beneficial results may, therefore, be obtained when the pivot linkages have a generally "U" shaped cross-member receiving end. The cross-members are insertable into the "U" shaped end of the pivot linkages and locked into place by locking means. The preferred locking means are bolts that extend transversely across the "U" shaped end. This facilitates tine replacement, as the cross-members which support the tines may be removed from the "U" shaped ends of the pivot linkages upon removal of the transverse bolts which lock them in place.

Although beneficial results may be obtained through the use of the harrow drawbar assembly, as described above, it is important that the means for attaching the first end of the spring straps to the drawbar hold the spring straps securely. Even more beneficial results may, therefore, be obtained when a bent bolt form of attachment means is used. This bent bolt form of attachment consists of a first beam-engaging element for engaging a first face of the beam, a second beam-engaging element for engaging a second face of the beam and a third beam-engaging element for engaging a third face of the beam. The third beam-engaging element has a contiguous flanged portion at the free extremity lying at an acute angle thereto. The first, second and third beam-engaging elements lie substantially in a plane and are arranged to form a U-shaped configuration snugly fitting the three faces of the beam. The second beam-engaging element is located at a trough of the U-shaped configuration. The flanged portion of the third beam engaging element forms an outwardly flared free end of the U-shaped configuration. A bent bolt is connectable at right angles to the first beam-engaging element. The bent bolt has a first straight portion extending from the first beam engaging element parallel to the second beam-engaging element for engaging the fourth face of the beam, a bent portion for bending around the corner at which the third and fourth faces of the beam meet, and a second straight portion extending from the bent portion substantially perpendicular to the flanged portion of the third beam-engaging element and connectable thereto.

The bent bolt form of attachment, as described, has been found to be a more secure form of attachment than bolting directly to the drawbar. Bolt are less prone to work loose as a result of vibration and forces imparted as the harrow frame traverses the contours of the ground surface.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
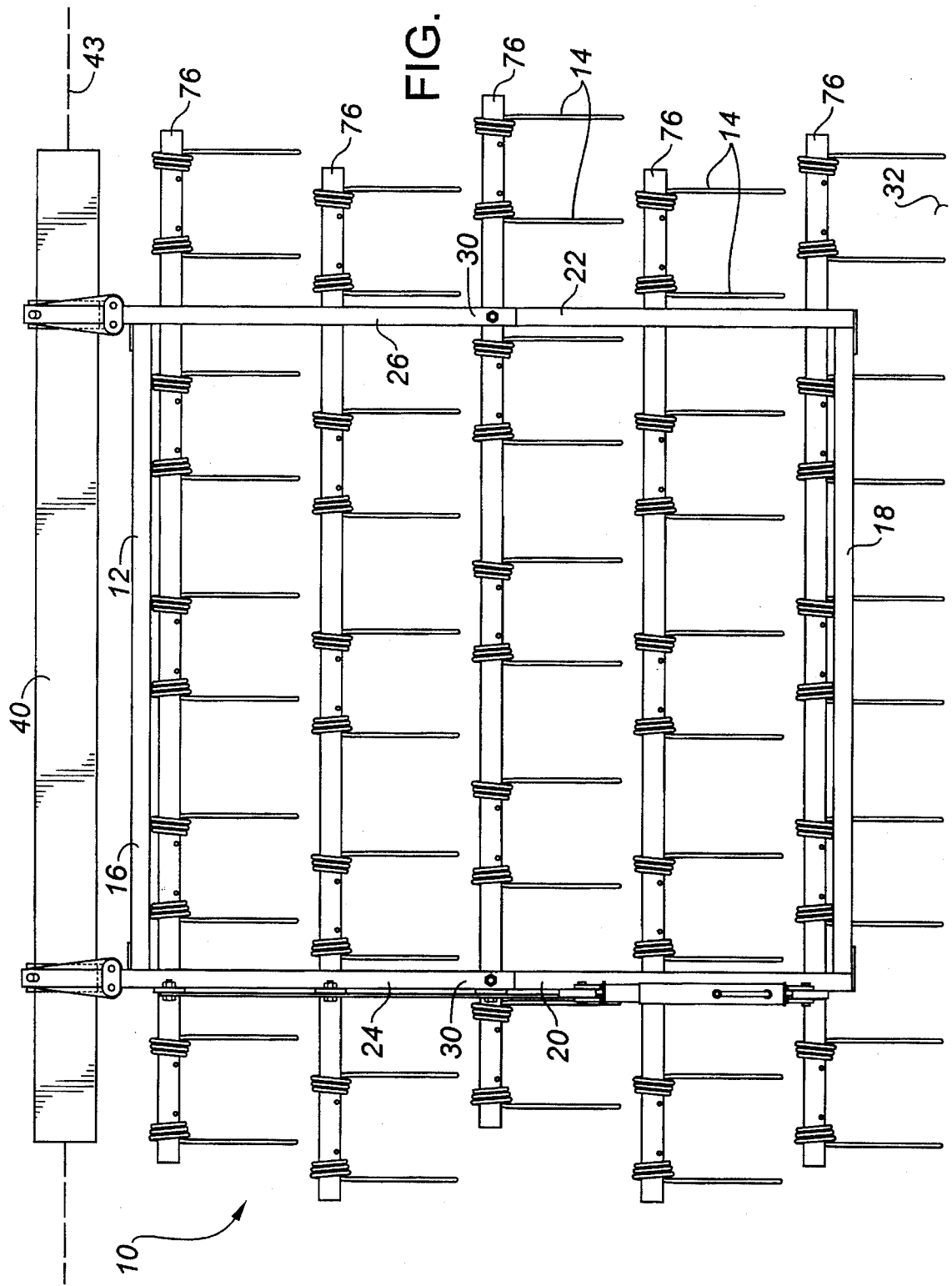
FIG. 1 is a top plan view of a harrow drawbar assembly constructed in accordance with the teachings of the present invention.

The preferred embodiment, a harrow drawbar assembly generally identified by reference numeral 10, will now be described with reference to FIGS. 1 and 3.

Figure 2:
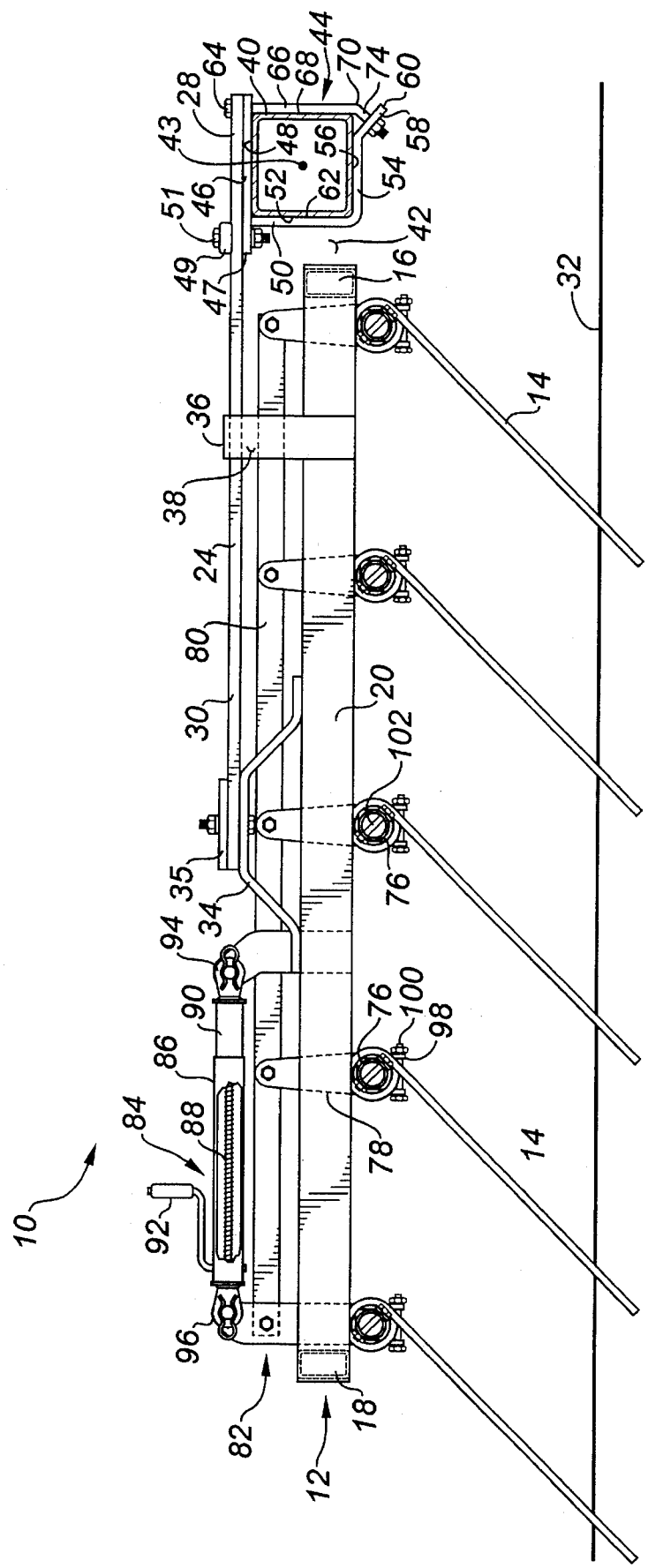
FIG. 2 is a side elevation view of a harrow drawbar assembly constructed in accordance with the teachings of the present invention.

Referring to FIG. 1, harrow drawbar assembly 10 has a substantially rectangular harrow frame 12 with depending tines 14. For the purpose of this description harrow frame 12 can be considered to include a front support member 16, a back support member 18, and opposed side support members 20 and 22. A pair of spring straps 24 and 26 are provided. Spring straps 24 and 26 each have a first end 28 and a second end 30. Second ends 30 of spring straps 24 and 26 are secured to opposed side support members 20 and 22, respectively, of harrow frame 12. This wide stance provides an even distribution of pressure exerted by spring straps 24 and 26 upon harrow frame 12 to maintain tines 14 in contact with a ground surface 32. Referring to FIG. 2, harrow frame 12 has raised spring mounting support brackets 34 to which second ends 30 of spring straps 24 and 26 are attached. Spring mounting support brackets 34 serve to raise spring straps 24 and 26 above harrow frame 12 and maintain spring straps 24 and 26 in spaced relation to harrow frame 12 to accommodate limited pivotal movement of harrow frame 12. If spring mounting support brackets 34 were not raised, spring straps 24 and 26 would be placed in face to face contact with harrow frame 12 and would inhibit pivotal movement. A reinforcing top plate 35 is disposed between spring mounting support brackets 34 and spring straps 24 and 26 to reduce bending stresses upon spring mounting support brackets 34 as harrow frame 12 pivots during use. Harrow frame 12 has support cradles 36 extending from opposed side support members 20 and 22 adjacent first end 28 of spring straps 24 and 26. Support cradles 36 overlie and limit movement of spring straps 24 and 26. However, each of support cradles 36 have a clearance space 38 to accommodate limited pivotal movement of harrow frame 12. Referring to FIG. 2, there is illustrated a drawbar 40. It is preferred that drawbar 40 be mounted for rotation about a substantially horizontal axis such as a longitudinal axis 41 of drawbar 40. This enables the downward pressure exerted by spring straps 24 and 26 upon harrow frame 12 to be increased by selectively rotating drawbar 40 to preload spring straps 24 and 26. It is also preferred that a clearance space 42 be provided between drawbar 40 and harrow frame 12. This permits harrow frame 12 to pivot freely to conform to contours of ground surface 32 without interference from drawbar 40. It is preferred that a bent bolt spring holder 44 be used for attaching first ends 28 of spring straps 24 and 26 to drawbar 40. Referring to FIG. 1, spring straps 24 and 26 extend substantially horizontally from drawbar 40 and serve as means by which harrow frame 12 is pulled by drawbar 40. That portion of drawbar 40 to which bent bolt spring holder 44 attaches is in the form of a beam. Bent bolt spring holder 44 is best illustrated in FIG. 2 and includes: a first beam-engaging element 46 for engaging a first face 48 of drawbar 40; a second beam-engaging element 50 for engaging a second face 52 of drawbar 40; a third beam-engaging element 54 for engaging a third face 56 of drawbar 40 and a contiguous flanged portion 58 at a free extremity 60 of third beam-engaging element 54 and lying at an obtuse angle thereto. First 46, second 50 and third 54 beam-engaging elements lie substantially in a plane and are arranged to form a generally U-shaped configuration snugly fitting three faces 48, 52, and 56 of drawbar 40. Second beam-engaging element 50 is located at a trough 62 of the U-shaped configuration. The flanged portion 58 of third beam engaging element 54 forms an outwardly flared free end of the U-shaped configuration. A bent bolt 64 is connectable at right angles to first beam-engaging element 46 and has a first straight portion 66 extending from first beam engaging element 46 parallel to second beam-engaging element 50 for engaging a fourth face 68 of drawbar 40 and a bent portion 70 for bending around a corner 72 at which third 54 and fourth 68 faces of drawbar 40 meet. Bent bolt 64 also has a second straight portion 74 extending from bent portion 70 substantially perpendicular to flanged portion 58 of third beam-engaging element 54 and connectable thereto. First beam-engaging element 46 has a projecting portion 47 that projects beyond second beam-engaging element 50. Projecting portion 47 has two spaced apart bolt receiving openings (not shown), spring straps 24 and 26 are clamped to projecting portion 47 of first beam-engaging element 46 by means of a transverse clamping plate 49 bolted to projecting portion 47 by bolts 51 received in the bolt receiving openings.

Referring to FIG. 1, tines 14 are spring-form tines mounted onto cross-members 76. Referring to FIG. 2, cross-members 76 are pivotally attached to opposed side members 20 and 22 of harrow frame 12 by a pivot linkage 78. Pivot linkages 78 for each of cross-members 76 are connected to an adjustment arm 80, thereby forming a parallelogram linkage, generally identified by reference numeral 82. Parallelogram linkage 82 is mounted on side member 20 of harrow frame 12. A mechanical screw linkage, generally identified by reference numeral 84, is provided for shifting the position of parallelogram linkage 82. This pivots pivot linkages 78 to alter the position of cross-members 76 and the force with which spring-form tines 14 engage ground surface 32. Mechanical screw linkage 84 includes a housing 86 which houses a screw 88 and a travelling member 90 which travels up and down screw 88 as screw 88 is rotated. Screw 88 is rotated by means of a crank 92. Mechanical screw linkage 84 has a first end 94 fixed to side member 20 of harrow frame 12 and a second end 96 secured to parallelogram linkage 82. Each of pivot linkages 78 have a generally "U" shaped cross-member receiving end 98. Cross-members 76 are insertable into "U" shaped cross-member receiving ends 98 of pivot linkages 78 and locked into place by bolts 100 that extend transversely across "U"shaped cross-member receiving ends 98, thereby facilitating rapid replacement of tines 14. The spacing of tines 14 along cross-members 76 are maintained by fasteners 102 which extend transversely through cross-members 76.

Figure 3:
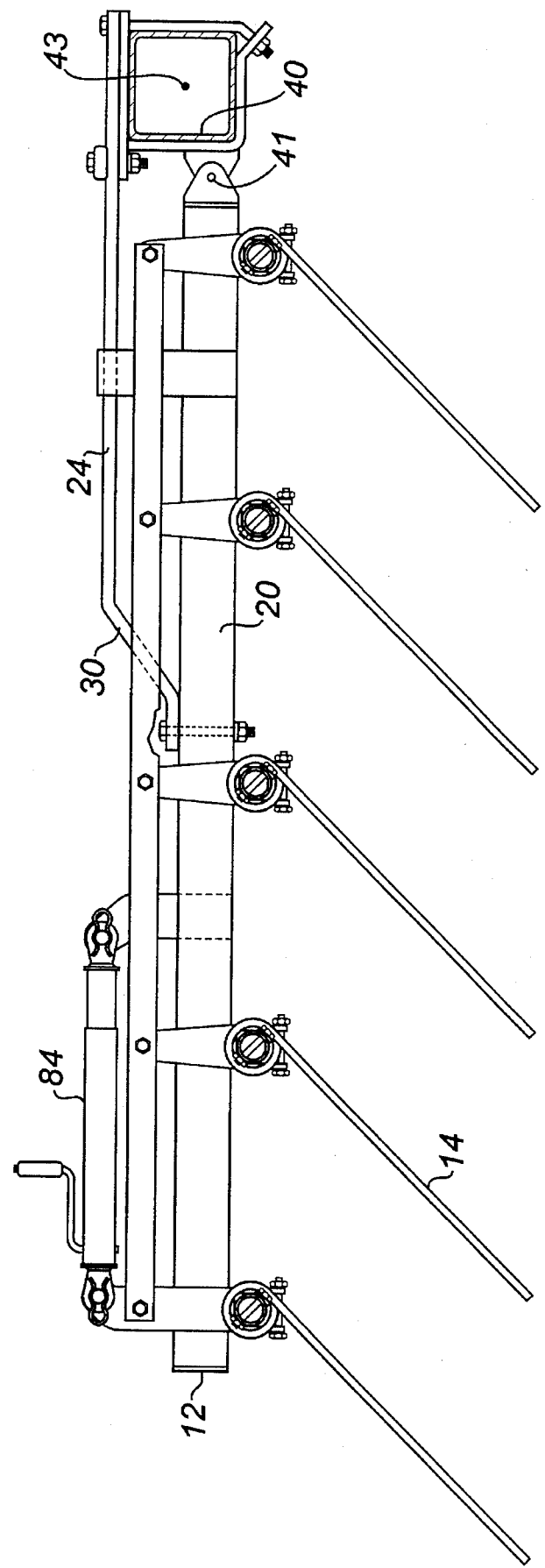
FIG. 3 is a side elevation view of an alternate harrow drawbar assembly constructed in accordance with the teachings of the present invention.

FIG. 3 is intended to illustrate some obvious design variations which can be made to harrow drawbar assembly 10 within the inventive concept. It is important that spring straps 24 and 26 not be in face to face contact with harrow frame 12 as this would inhibit movement of harrow frame 12. In the embodiment illustrated in FIG. 2, spring straps 24 and 26 are attached to harrow frame 12 by means of brackets 34 which are raised to provide clearance. As is illustrated in FIG. 3, the same result can be obtained by bending second ends 30 of spring straps 24 and 26. It is equally important that harrow frame 12 be free to move to conform to contours of ground surface 32 without interference from drawbar 40. In the embodiment illustrated in FIG. 2, this is accommodated by providing a clearance space 42 between harrow frame 12 and drawbar 40. As is illustrated in FIG. 3, the same result can be obtained by pivotally mounting by means of pivotal connection 41 harrow frame 12 to drawbar 40.

The use and operation of harrow drawbar assembly 10 will now be described with reference to FIGS. 1 and 2. Spring straps 24 and 26 serve as the means by which harrow frame 12 is pulled by drawbar 40. Spring straps 24 and 26 exert a resilient pressure upon harrow frame 12 which enables harrow frame 12 to conform to the contours of ground surface 32. There are a number of factors which facilitate movement of harrow frame 12. Spring mounting support brackets 34 are raised and each of support cradles 36 have a clearance space 38 so that spring straps 24 and 26 do not strike harrow frame 12 during operation. This enables spring straps 24 and 26 to resiliently control the movement of harrow frame 12, without unduly limiting such movement. Clearance space 42 is provided between drawbar 40 and harrow frame 12. This permits harrow frame 12 to pivot freely to conform to contours of ground surface 32 without interference from drawbar 40. The degree of force exerted by tines 14 is closely related to the angle at which tines 14 are positioned. This angle, and consequently the degree of force exerted by tines 14, is adjusted by means of parallelogram linkage 82. Parallelogram linkage 82 is moved to alter the position of tines 14 by manipulation of crank 92 of mechanical screw linkage 84. Manipulation of crank 92 turns screw 88. Depending upon the direction of rotation, travelling member 90 travels up or down screw 88 to either draw first end 94 and second end 96 of mechanical screw linkage 84 closer together or farther apart. Where drawbar 40 is rotatable about longitudinal axis 41 or a substantially horizontal axis that is parallel to longitudinal axis 41, a preload can be placed upon spring straps 24 and 26, increasing the downward pressure which they exert upon harrow frame 12.

There are some other features of harrow drawbar assembly 10 which are worthy of note as they either reduce the need for servicing or facilitate servicing. Bent bolt spring holder 44 has proven to have improved resistance to vibration. When bent bolt spring holder 44 is used there is less likelihood of bolts attaching first end 28 of spring straps 24 and 26 to drawbar 40 working their way loose during operation. Tines 14 periodically need to be replaced. The construction of pivot linkages 78 with generally "U" shaped cross-member receiving ends 98 greatly simplifies replacement of tines 14. Cross-members 76 are insertable into "U" shaped cross-member receiving ends 98 of pivot linkages 78 and locked into place by bolts 100 that extend transversely across "U" shaped cross-member receiving ends 98. In order to replace tines 14 bolts 100 are removed enabling cross-members 76 to drop down. After tines 14 have been replaced cross-members are reinserted into "U" shaped cross-member receiving ends 98 and bolts 100 repositioned to lock cross-members 76 in place.

It is not possible to illustrate or describe every variation in the form of spring strap 24 and 26 which can be used. It should be noted, however, that spring straps 24 and 26 can be formed in a number of shapes and still perform the intended function. Although two spring straps are illustrated, it also should be noted that the invention will function with a single spring strap (if properly positioned) or with a greater number of spring straps. It should be noted that support members 16 and 18 are merely intended for reinforcement and could be eliminated. It is not possible to illustrate or describe all the various possible configurations for harrow frame 12, although some configurations such as an "I" configuration are more viable than others. It will finally be apparent to one skilled in the art that other modifications may be made to various aspects of the illustrated embodiment without departing from the spirit and scope of the invention as defined by the claims.

The embodiments of the invention in which an exclusive property or privilege is claimed are as follows:

1. A harrow drawbar assembly, comprising in combination:

a drawbar having a longitudinal axis, the drawbar being mounted substantially horizontally and rotatable about a selected one of the longitudinal axis and an axis substantially parallel to the longitudinal axis;

a harrow frame including a plurality of pivotal linkages pivotally connecting a plurality of cross-members to the harrow frame, wherein the plurality of cross-members include a plurality of tines, the plurality of pivotal linkages allow the plurality of cross-members to pivot causing a shift in the position of the plurality of cross-members resulting in a change in force in which the plurality of tines engage the ground surface; and at least one spring strap having a first end and a second end, the first end of the at least one spring strap being rigidly secured to the drawbar and the second end of the at least one spring strap being flexibly secured to the harrow frame, wherein the at least one spring strap exerts a vertical pressure on the harrow frame acting towards the ground surface and the at least one spring strap is resilient in response to counter-pressure from the ground surface, the vertical pressure being adjustable by selectively rotating the drawbar about the selected axis where the vertical pressure from the adjustment of the drawbar and the change in force in which the tines engage the ground surface are independent of each other.

* * * * *